United States Patent
Tan et al.

(10) Patent No.: US 11,481,543 B2
(45) Date of Patent: Oct. 25, 2022

(54) SYSTEM AND METHOD FOR TEXT MODERATION VIA PRETRAINED TRANSFORMERS

(71) Applicant: VERIZON PATENT AND LICENSING INC., Basking Ridge, NJ (US)

(72) Inventors: Fei Tan, Harrison, NJ (US); Yifan Hu, Mountain Lakes, NJ (US); Changwei Hu, New Providence, NJ (US); Keqian Li, New York, NY (US); Kevin Yen, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/125,660

(22) Filed: Dec. 17, 2020

(65) Prior Publication Data
US 2022/0198130 A1 Jun. 23, 2022

(51) Int. Cl.
*G06F 17/00* (2019.01)
*G06F 40/166* (2020.01)
*G06N 20/00* (2019.01)
*G06K 9/62* (2022.01)
*G06F 40/284* (2020.01)

(52) U.S. Cl.
CPC .......... *G06F 40/166* (2020.01); *G06F 40/284* (2020.01); *G06K 9/6256* (2013.01); *G06N 20/00* (2019.01)

(58) Field of Classification Search
CPC .... G06F 40/166; G06F 40/284; G06F 3/0485; G06F 40/197; G06F 3/167; G06F 3/04842; G06N 20/00; G06K 9/6256

USPC ........................................................ 715/256
See application file for complete search history.

(56) References Cited

U.S. PATENT DOCUMENTS

2020/0065361 A1* 2/2020 Lewbel ................ G06F 40/166

OTHER PUBLICATIONS

Sondej, Filip, Autocorrect, GitHub, https://github.com/fsondej/autocorrect, printed Apr. 15, 2021 (4 pages).

(Continued)

*Primary Examiner* — Jason T Edwards

(57) ABSTRACT

The present teaching relates to method, system, medium, and implementations for text processing. Upon receiving input data including a plurality of text strings, a plurality of manipulated text strings are generated for each of the plurality of training text strings by first applying a manipulation to each of at least one original token in the text string to generate a manipulated token, where the original token has a ground truth token label and then determining, with respect to each manipulated token, a ground truth action which, when applied to the manipulated token, yields the original token with the ground truth token label. Training data are generated with a plurality of training data packs, each of which corresponds to one of the plurality of text strings in the input data and includes a manipulated text string with at least one manipulated token, at least one ground truth token label, and at least one ground truth action which, when applied to the at least one manipulated token produces the at least one ground truth token label. The training data are for training text moderation models that facilitate text moderation.

20 Claims, 12 Drawing Sheets

(56) References Cited

OTHER PUBLICATIONS

Bassil, Youssef, Parallel Spell-Checking Algorithm Based on Yahoo! N-Grams Dataset, International Journal of Research and Reviews in Computer Science (IJRRCS), Feb. 2012, vol. 3, No. 1, arXiv preprint arXiv:1204.0184, Beirut, Lebanon (8 pages).

Microsoft, Bing Spell Check API, https://azure.microsoft.com/en-in/services/cognitive-services/spell-check/, printed Apr. 15, 2021 (7 pages).

Devlin et al., BERT: Pre-training of Deep Bidirectional Transformers for Language Understanding, In Proceedings of the 2019 Conference of the North American Chapter of the Association for Computational Linguistics: Human Language Technologies, vol. 1 (Long and Short Papers), Jun. 2-Jun. 7, 2019, pp. 4171-4186 (16 Pages).

Grammarly Inc., https://app.grammarly.com/, printed Apr. 15, 2021 (7 pages).

Islam et al., Real-Word Spelling Correction using Google Web 1T n-gram Data Set, In Proceedings of the 18th ACM International Conference on Information and Knowledge management, 2009, pp. 1689-1692 (4 Pages).

Wang et al., Structbert: Incorporating Language Structures Into Pre-Training for Deep Language Understanding, Sep. 27, 2019, arXiv preprint arXiv: 1908.04577 (9 Pages).

Whitelaw et al., Using the Web for Language Independent Spellchecking and Autocorrection, In Proceedings of the 2009 Conference on Empirical Methods in Natural Language Processing, Aug. 6-7, 2009, vol. 2-vol. 2, 2009, pp. 890-899, Association for Computational Linguistics (10 Pages).

Tan et al., TNT: Text Normalization based Pre-training of Transformers for Content Moderation, In Proceedings of the 2020 Conference on Empirical Methods in Natural Language Processing (EMNLP), Nov. 16-20, 2020, pp. 1735-4741 (7 Pages).

* cited by examiner

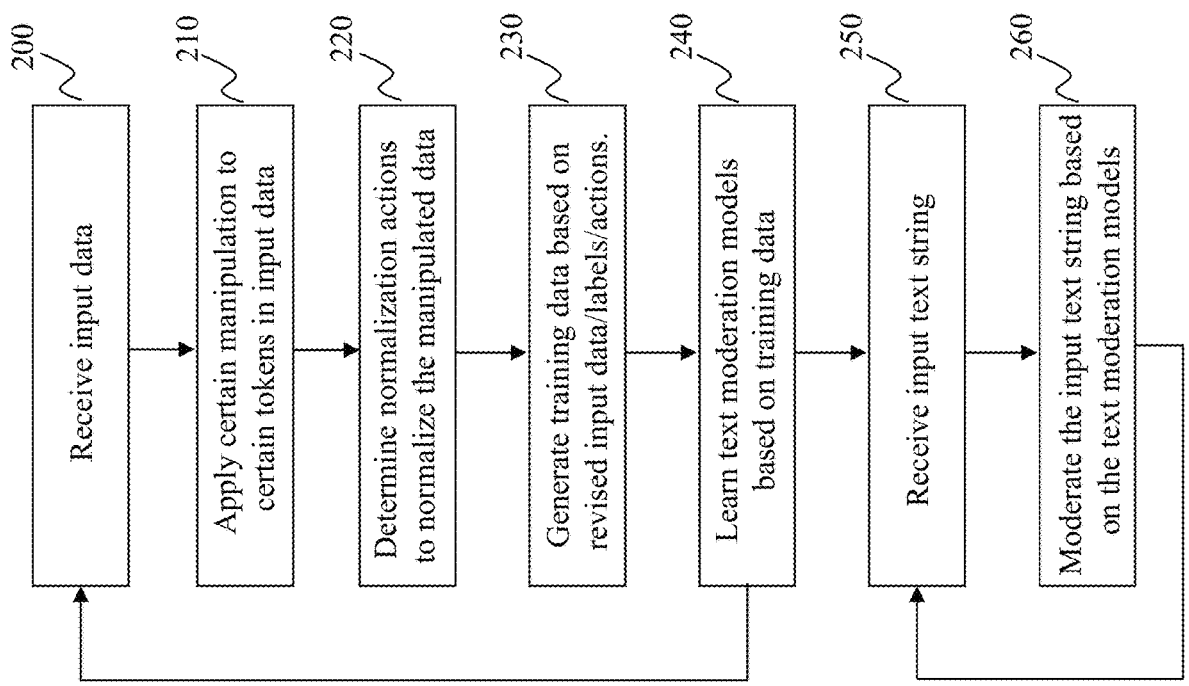

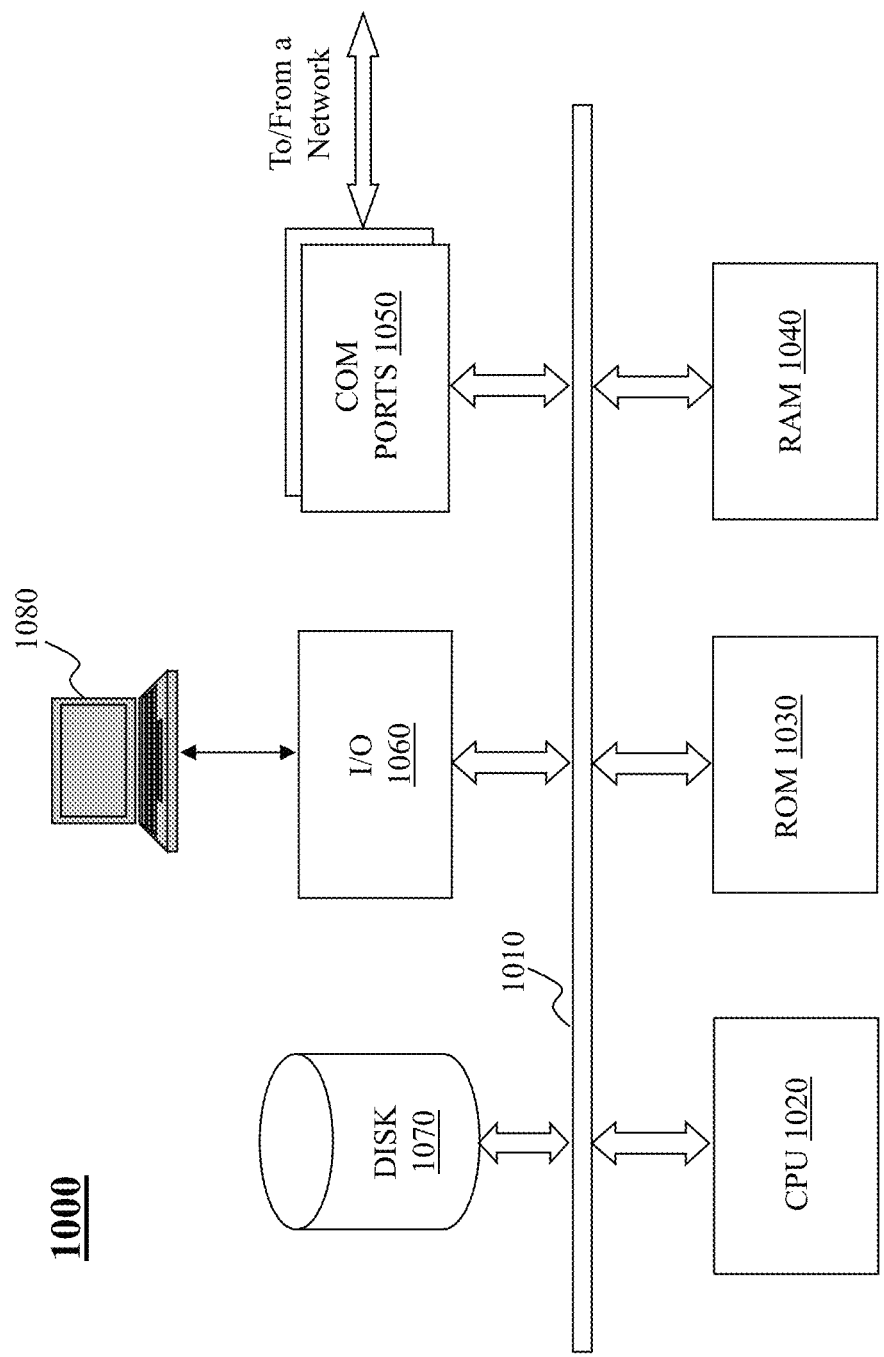

SYSTEM AND METHOD FOR TEXT MODERATION VIA PRETRAINED TRANSFORMERS

BACKGROUND

1. Technical Field

The present teaching generally relates to computer. More specifically, the present teaching relates to machine learning based text processing.

2. Technical Background

In the modern society with ubiquitous presence of network connection and anywhere/anytime accesses, more and more people communicate not only with people they know but also to the general public by posting a large amount of information via various platforms including private forums, semi-public forums, and public forums. For online communication tools such as Facebook or Twitter provide communication channels encompassing private, semi-private, and public forums. Because of the widely available forums and the ease of sending information via different communication platforms to different audiences, not only there is the issue of information explosion, but also it is much more difficult to ensure the quality of the content being communicated on various online platforms. Such quality issues include simple ones such as spelling errors in content and more significant ones such as using socially unacceptable language in online content.

Automated intelligent text processing has been developed to address the need to ensure quality of online content. For example, there are techniques developed for auto-correction of spellings. Other techniques have been developed to detect offensive words used in text, such as certain insulting words referring to African American people or dirty words. It has However, counter measures have also been adopted that use alternative ways or intentionally obfuscate certain words or abusive words to avoid being detected. This could sidestep the effect of automated content detection and processing to remove or normalize detected offensive content.

Thus, there is a need for methods and systems that allow more effective approaches to address the challenges in ensuring quality of online content.

SUMMARY

The teachings disclosed herein relate to methods, systems, and programming for text processing. More particularly, the present teaching relates to methods, systems, and programming related to text moderation.

In one example, a method, implemented on a machine having at least one processor, storage, and a communication platform capable of connecting to a network for text processing. Upon receiving input data including a plurality of text strings, a plurality of manipulated text strings are generated for each of the plurality of training text strings by first applying a manipulation to each of at least one original token in the text string to generate a manipulated token, where the original token has a ground truth token label and then determining, with respect to each manipulated token, a ground truth action which, when applied to the manipulated token, yields the original token with the ground truth token label. Training data are generated with a plurality of training data packs, each of which corresponds to one of the plurality of text strings in the input data and includes a manipulated text string with at least one manipulated token, at least one ground truth token label, and at least one ground truth action which, when applied to the at least one manipulated token produces the at least one ground truth token label. The training data are for training text moderation models that facilitate text moderation.

In a different example, a system for text processing is disclosed which includes a training data generator, a manipulation mechanism, a normalization action determiner, and a training data pack generator. The training data generator is configured for receiving input data including a plurality of text strings. The manipulation mechanism is configured for generating a plurality of manipulated text strings by, for each of the plurality of training text strings, applying a manipulation to each of at least one original token in the text string to generate a manipulated token, wherein the original token has a ground truth token label. The normalization action determiner is configured for determining, with respect to each manipulated token, a ground truth action which, when applied to the manipulated token, yields the original token with the ground truth token label. The training data pack generator is configured for generating training data having a plurality of training data packs, each of which corresponds to one of the plurality of text strings in the input data and includes a manipulated text string with at least one manipulated token therein, at least one ground truth token label, and at least one ground truth action which, when applied to the at least one manipulated token produces the at least one ground truth token label, wherein the training data are for training text moderation models that facilitate text moderation.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for text processing. Upon receiving input data including a plurality of text strings, a plurality of manipulated text strings are generated for each of the plurality of training text strings by first applying a manipulation to each of at least one original token in the text string to generate a manipulated token, where the original token has a ground truth token label and then determining, with respect to each manipulated token, a ground truth action which, when applied to the manipulated token, yields the original token with the ground truth token label. Training data are generated with a plurality of training data packs, each of which corresponds to one of the plurality of text strings in the input data and includes a manipulated text string with at least one manipulated token, at least one ground truth token label, and at least one ground truth action which, when applied to the at least one manipulated token produces the at least one ground truth token label. The training data are for training text moderation models that facilitate text moderation.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is a flowchart of an exemplary process for text moderation via pre-trained transformers, in accordance with an exemplary embodiment of the preset teaching;

FIG. 10 is an illustrative diagram of an exemplary computing device architecture that may be used to realize a specialized system implementing the present teaching in accordance with various embodiments.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to improve the current state of the art in text processing. Particularly, the present teaching discloses a solution that trains transformers with training data derived based on text normalization having context support for simultaneous actions. This present teaching overcomes the challenge and deficiency of the word based traditional solutions via a framework that is based on context rich training data so that the trained text moderation model is able to facilitate context sensitive text moderation processing.

Figure 1A:
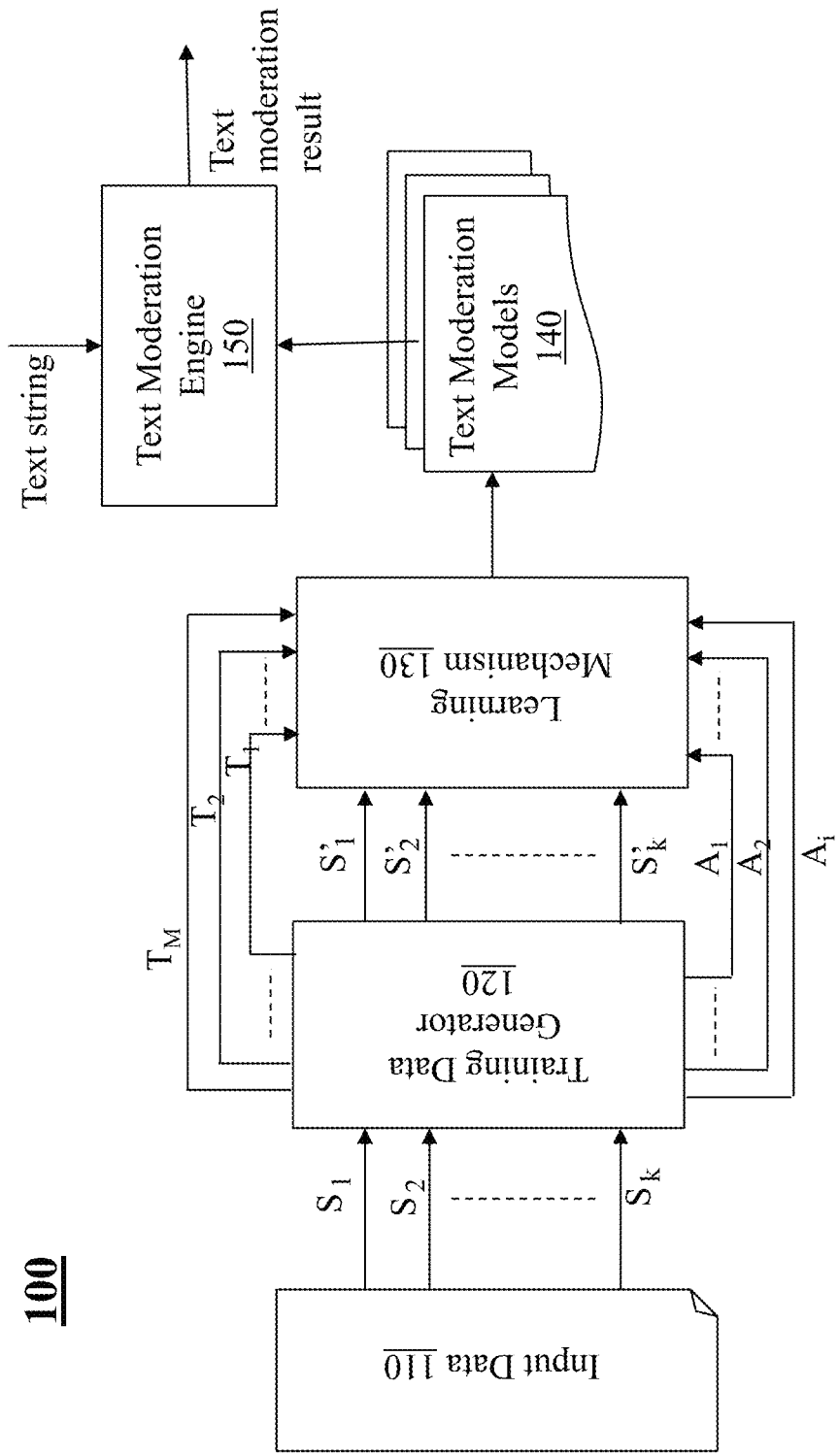
FIG. 1A depicts an exemplary framework for text moderation via pre-trained transformers, in accordance with an exemplary embodiment of the present teaching.

FIG. 1A depicts an exemplary framework 100 for text moderation via pre-trained transformers, in accordance with an exemplary embodiment of the present teaching. In this illustrated embodiment, the framework 100 comprises a training data generator 120, a learning mechanism 130, and a text moderation engine 150. The training data generator 120 is provided for generating training data for the learning mechanism 130 based on input data 110. Training data 110 provides input text strings $S_1, S_2, \ldots, S_k$, which are normal text strings that do not need to be moderated (or that have already been moderated or normalized). The training data generated based on such input text strings $S_1, S_2, \ldots, S_k$ include several components. First, the training data include a plurality of corresponding text strings $S_1', S_2', S_k'$, which are manipulated version of the input text strings with certain tokens $T_1, T_2, \ldots, T_M$ being manipulated using text processing, where tokens $T_1, T_2, \ldots, T_M$ are ground truth token labels. The manipulated tokens, say $T_1', T_2', \ldots, T_M'$ may correspond to manipulated tokens (not shown in FIG. 1A). Second, the training data also include the ground truth tokens $T_1, T_2, \ldots, T_M$.

Figure 1B:
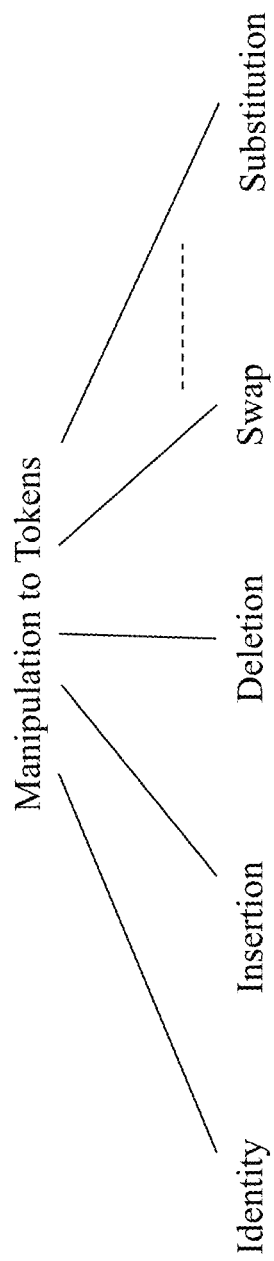
FIG. 1B shows exemplary types of actions to be applied in text moderation, in accordance with an exemplary embodiment of the present teaching.

FIG. 1B illustrates exemplary types of manipulations that can be applied to words or tokens of an input text string to produce manipulated tokens and manipulated text strings, in accordance with an embodiment of the present teaching. For instance, as shown, manipulations that can be applied to a token to generate a modified token include identity, insertion, deletion, swap, . . . , and substitute. Via manipulation to tokens, it yields manipulated text strings that need to be moderated. Examples of such manipulations to text strings and the results thereof are provided in the below Table 1.

| Manipulation | Text -> Modified Text | Action Taken |
|---|---|---|
| substitution | I damn sure didn't vote for the Marxist bastard! → I damn sure didn't vote for the Marxist 8astard! | b → 8(0) |
| swap | Mario = dumb cunt → mario = dumb cutn | n ↔ t(1) |
| deletion | Don Lemon is a shithead. → Don Lemon is a shthead. | i (3) |
| insertion | Piss on Putin! → Pi-ss on Putin | —(2) |
| identity | She is a nice lady. → She is a nice lady. | c(4) |

Third, the training data also include a set of actions $A_1, A_2, \ldots, A_i$, which correspond to text processing actions that, when applied to the manipulated tokens $T_1', T_2', \ldots, T_M'$ in the manipulated text strings $S_1', S_2', \ldots, S_k'$, will normalize the manipulated tokens to yield normal or ground truth tokens $T_1, T_2, \ldots, T_M$ and, hence, to produce moderated text strings $S_1, S_2, \ldots, S_k$. That is, actions $A_1, A_2, \ldots, A_i$ and token labels $T_1, T_2, \ldots, T_M$ serve as ground truth for learning in terms of what actions to apply to which tokens to generate moderated text strings (or input text strings $S_1, S_2, \ldots, S_k$). Such training data provide not only the ground truth such as actions to be applied and token labels after such actions but also contextual information (such as other tokens in the text strings and how they are arranged in the text strings). Both ground truth and the contextual information are relevant and constitute knowledge as to when and how text moderation is to be carried out. Thus, text moderation using such learned models is context sensitive. In some embodiments, M=i, i.e., each token in the text string is applied with one action. However, this is merely an illustration rather than limitation to the present teaching. Specifics of how to generate training data based on the input data 110 are provided with respect to FIGS. 3A-4.

In this manner, the training data may be generated in an automated manner with simultaneously provided ground truth and contextual information. Such generated training data are fed to the learning mechanism 130, which learns in what context (a text string) which text token(s) is to be moderated in what way (what action to take to modify the token) in order to generate moderated text strings. Through learning, the leaning mechanism 130 produces text moderation models 140, which capture more than mere the knowledge for detecting and modifying individual words due to the contextual knowledge present in the training data generated in accordance with the present teaching. As the training data can be generated in an automated manner as discussed herein, the text moderation models can be continuously updated based on a continuous supply of training data. With the trained text moderation models 140, when the text moderation engine 150 takes a text string as an input, it can decide how to moderate, when needed determined in accordance with the text moderation models 140, the text string to generate a text moderation result.

Framework 100 includes two separate processes. The first process corresponds to a learning process which involves taking input data, converting into training data, learning from the training data, and updating the text moderation models 140. The second process corresponds to a text moderation process which involves taking a text string as an input, accessing the learned text moderation models 140 to determine whether and how to moderate the text string, and applying actions to token(s) in the text string, determined based on the text moderation models 140, to generate a text moderation result (which may or may not be moderated as compared with the input text string). FIG. 2 is a flowchart of an exemplary process of the framework 100 for text moderation via pre-trained transformers, in accordance with an exemplary embodiment of the preset teaching. As can be seen, the flowchart in FIG. 2 includes two loops, corresponding to the two separate processes of the framework 100, as discussed herein.

The first process for training text moderation models 140 involves steps 200-240, while the second process for using the trained text moderation models 140 to moderate input text strings involves steps 250 and 260. During training process, when input data with text string input text strings $S_1, S_2, \ldots, S_k$ are received at 200, the training data generator 120 applies, at 210, certain manipulations to certain tokens $T_1, T_2, \ldots, T_M$ in the input data (to generate manipulated tokens $T_1', T_2', \ldots, T_M'$) to produce manipulated text strings $S_1', S_2', \ldots, S_k'$. To generate ground truth, the training data generator 120 determines, at 220, normalization actions $A_1, A_2, \ldots, A_i$ to be applied to manipulated tokens to obtain moderated (or normalized) text strings. With known labels for tokens $T_1, T_2, \ldots, T_M$, known actions $A_1, A_2, \ldots, A_i$, and the manipulated text strings $S_1', S_2', \ldots, S_k'$, the training data generator 120 then generates, at 230, training data. The learning mechanism 130 then learns, at 240, the text moderation models 140 based on the training data. The process repeats whenever additional input data are received at 200. Details related to the learning mechanism 130 are provided with respect to FIGS. 5-6.

During the moderation process, when the text moderation engine 150 receives, at 250, a text string and proceeds to 260 to moderate the received text string based on the text moderation models 140. In doing so, the text moderation engine 150 may, by relying on the text moderation models, determine which tokens need to be normalized in what context and in what way (actions to take). Details related to the text moderation engine 150 are provided with respect to FIGS. 7-8. The moderation process continues whenever there is a text string is received.

Figure 3A:
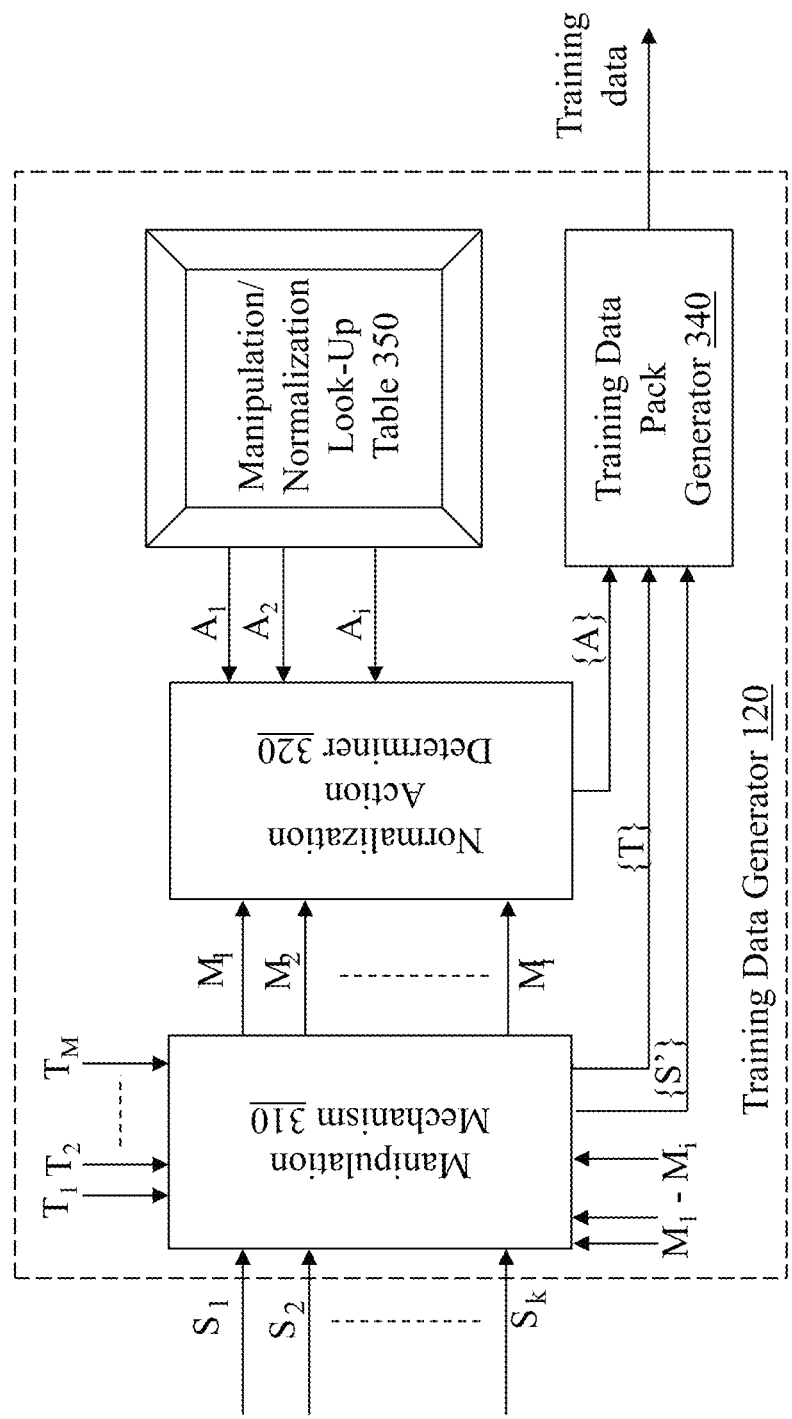
FIG. 3A depicts an exemplary high level system diagram of a training data generator, in accordance with embodiments of the present teaching.

FIG. 3A depicts an exemplary high level system diagram of the training data generator 120, in accordance with embodiments of the present teaching. In this illustrated embodiment, the training data generator 120 comprises a manipulation mechanism 310, a normalization action determiner 320, and a training data pack generator 340. The manipulation mechanism 310 takes input data $S_1, S_2, \ldots, S_k$ as input, applies a set of manipulations $M_1, M_2, \ldots, M_i$ to selected tokens $T_1, T_2, \ldots, T_M$ in the input data (to generate manipulated tokens $T_1', T_2', \ldots, T_M'$) to produce manipulated text strings $S_1', S_2', \ldots, S_k'$. In some embodiments, the tokens to be manipulated $T_1, T_2, \ldots, T_M$ and manipulations $M_1, M_2, \ldots, M_i$ to be applied thereto may be determined automatically. In some embodiments, tokens to be manipulated and the manipulations to be applied thereto may also be determined manually by actual users. As discussed herein, although generally M tokens selected to be modified by i manipulations, M may equal to i, i.e., for each selected token, one manipulation is applied.

Based on the manipulations $M_1, M_2, \ldots, M_i$, corresponding actions to be applied to normalize the manipulated tokens $A_1, A_2, \ldots, A_i$, are determined by the normalization action determiner 320. In some embodiments, such determination may be made based on a manipulation/normalization look-up table 350, which provides, e.g., paired manipulation and normalization actions. For instance, such a table may provide that if a manipulation is to delete a letter from a string (which can be a word or a token), its corresponding action for normalization is to insert a letter to a modified string after the deletion to generate a normalized original string. If another string is manipulated via a swap of two letters, its corresponding action for normalize the string is to swap the two letters back. If a string is manipulated by substituting a letter in the string with a different symbol (which can be a letter, a number, or a special symbol), the action to normalize the string is also substitute. Via this table look up, for each manipulation performed on a token, an action to be applied to normalize the token can be identified. As the original tokens $T_1, T_2, \ldots, T_M$ are known, they can be used as ground truth in the training data so that it is known as to what the normalization result is by applying the actions.

Figure 3B:
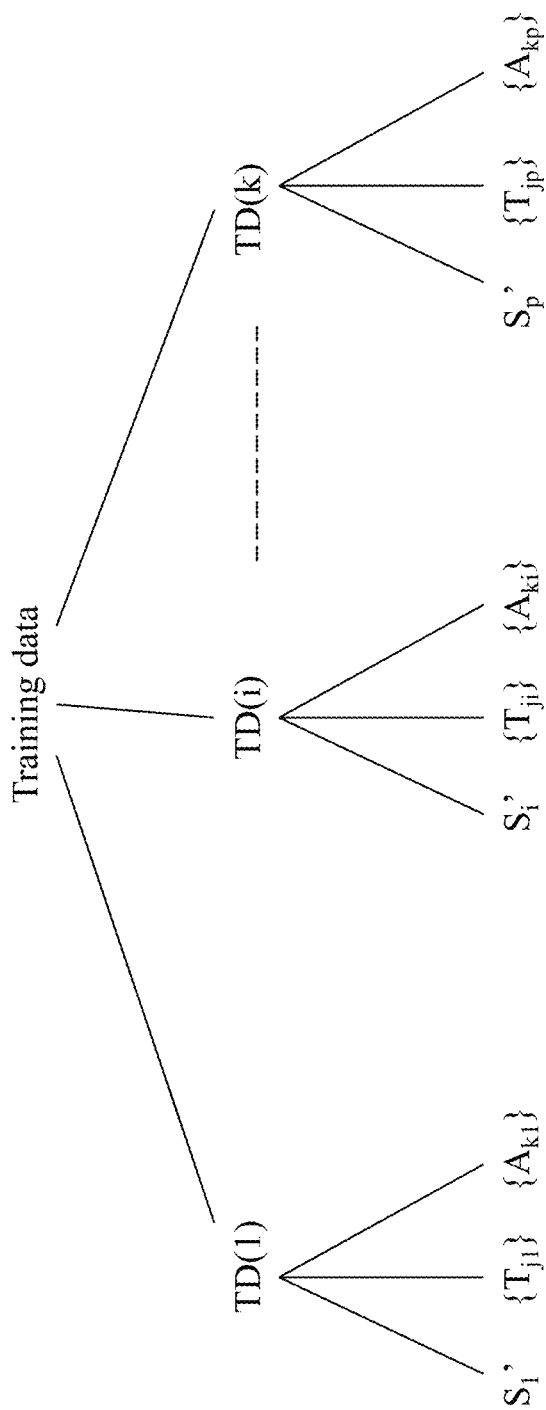
FIG. 3B shows exemplary organization of training data used for pre-training transformers, in accordance with an exemplary embodiment of the present teaching.

As shown in FIG. 3A, the manipulated input data $S_1', S_2', \ldots, S_k'$ or $\{S'\}$, the ground truth token labels of the manipulated tokens $T_1, T_2, \ldots, T_M$ or $\{T\}$, as well as ground truth normalization actions $A_1, A_2, \ldots, A_i$ or $\{A\}$ are fed to the training data pack generator 340 to generate training data packs of the training data. FIG. 3B shows an exemplary organization of training data used for pre-training transformers, in accordance with an exemplary embodiment of the present teaching. As illustrated, training data are organized as training data packs TD(1), . . . , TD(i), . . . , TD(p) . . . , each of the training data packs includes a manipulated text string, a set of normalized token labels {T}, and a set of normalization actions {A} to be applied to generate normalized tokens {T}.

Figure 4:
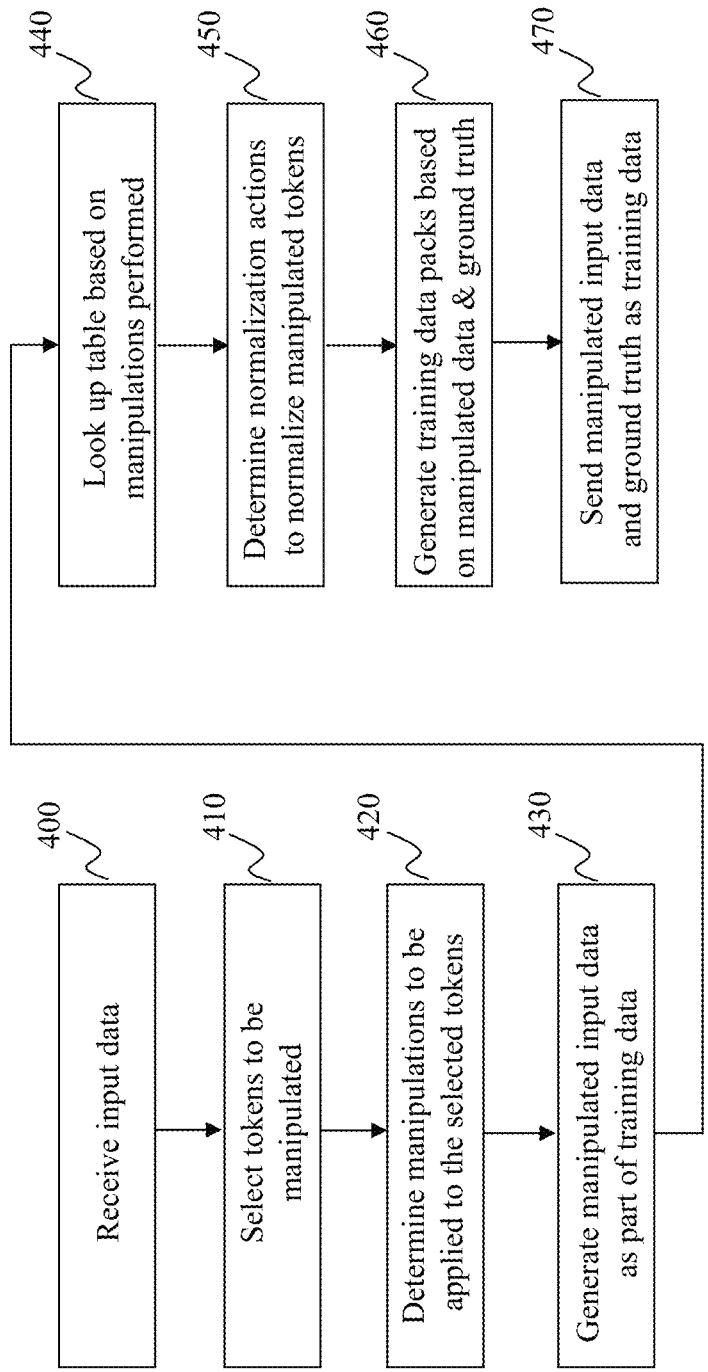
FIG. 4 is a flowchart of an exemplary process of a training data generator, in accordance with exemplary embodiments of the present teaching.

FIG. 4 is a flowchart of an exemplary process of the training data generator 120, in accordance with exemplary embodiments of the present teaching. When input data are received at 400, the manipulation mechanism 310 selects, at 410, a set of tokens to be manipulated and determines, at 420, manipulations to be applied to the selected tokens. The manipulated input data or {S'} are generated, at 430, by the manipulation mechanism 310 and sent, together with the selected tokens {T}, to the training data pack generator 340. Based on the manipulations $M_1, M_2, \ldots, M_i$ performed, the normalization action determiner 320 accesses the look-up table 330 at 440 and determined, at 450, a set of normalization actions {A} needed to normalize the manipulated tokens and sends {A} to the training data pack generator 340. Upon receiving the manipulated input data {S'}, the ground truth tokens {T} and normalization actions {A}, the training data pack generator 340 generates, at 460, training data packs and sends, at 470, such generated training data packs to the learning mechanism 130.

Figure 5:
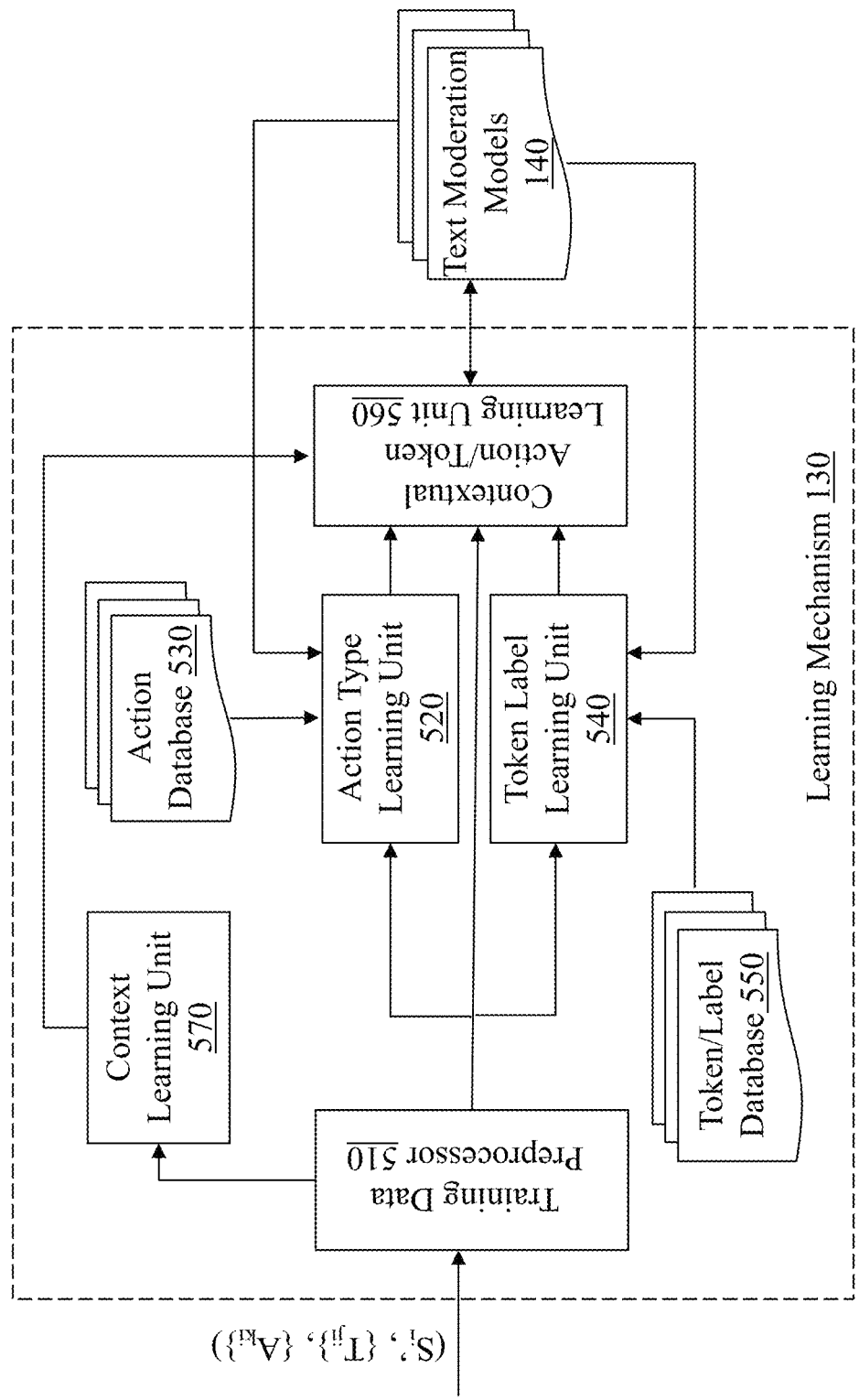
FIG. 5 depicts an exemplary high level system diagram of a learning mechanism for training transformers, in accordance with an exemplary embodiment of the preset teaching.

FIG. 5 depicts an exemplary high level system diagram of the learning mechanism 130, in accordance with an exemplary embodiment of the preset teaching. In this illustrated embodiment, the learning mechanism 130 comprises a training data preprocessor 510, an action type learning unit 520, a token label learning unit 540, a context learning unit 570, and a contextual action/token learning unit 560. When training data $(S_i', \{T_{ji}\}, \{A_{ki}\})$ are received, the training data preprocessor 510 processes the training data and provides the processed data to different training units for learning. In some embodiments, given a training data pack, the text string with manipulated tokens, the learning mechanism 130 learns the action type and token label by optimizing some objective functions. According to the present teaching, objective functions to be optimized in learning both action type and token labels with contextual information are provided below. Equation (1) is an exemplary objective function to be optimized in learning action types in text moderation. Equation (2) is an exemplary objective function to be optimized in learning token labels based on the training data.

$$O_{action} = \underset{\theta_0}{\operatorname{argmax}} \sum_{i=1}^{M} = w_i^\sigma \log P(o_i \mid t_i; \theta_0) \quad (1)$$

and $$O_{Token\ Label} = \underset{\theta_1}{\operatorname{argmax}} \sum_{i=1}^{M} w_i^\ell \log P(\ell_i \mid t_i; \theta_\ell) \quad (2)$$

where $t'_i$ is the observed token from an input text string and $\sigma_i$ and $\ell_i$ are ground-truth action type and token label as discussed herein. $\mathcal{M}$ represents the maximum length of an input sequence. $\theta_0$ and $\theta_\ell$ are sets of trainable parameters. $w_i^\sigma$ and $w_i^\ell$ are weights for action type and token label, respectively.

In some embodiments, the action type is learned via the action type learning unit 520 and the token label is learned via the token label learning unit 540, respectively. According to some embodiments of the preset teaching, as selections of action types and token labels in text moderation are related with respect to the context of an input text string, the learning mechanism 130 may simultaneously learn both aspects of determining an action type and selection of a token label. To do so, in some embodiments, during learning, the above two objective functions may be jointly optimized by, e.g., combining them into one as an overall objective function as shown below.

According to some embodiments of the preset teaching, as selections of an action type and a corresponding token label in text moderation are related with respect to the context of an input text string, the learning mechanism 130 may simultaneously learn both aspects of determining an action type and selection of a token label. To do so, in some embodiments, during learning, the above two objective functions may be optimized simultaneously by, e.g., combining them into one as shown below in Equation (3). The learning performed by the learning mechanism 130 may be carried out by optimizing the joint objective function O as defined in Equations (1), (2), and (3).

$$O = O_{action} + O_{token\ label} \quad (3)$$

During the learning, the action type learning unit 520 predicts action types based on training data text strings using previously learned parameters associated with the current text moderation models 140. The action type predictions are then compared with the ground truth action types provided in the training data. Discrepancies, if any, are identified and used to learn to adjust parameters of the models in order to optimize the objective function for action type prediction. Similarly, the token label learning unit 540 predicts token labels based on training data text strings using previously learned parameters associated with the current text moderation models 140. The token label predictions are then compared with the ground truth token labels provided in the training data. Discrepancies, if any, are then identified and used to learn to adjust parameters of the models in order to optimize the objective function for token label prediction.

In some embodiments, the learning mechanism 130 may also optionally include a context learning unit 570, which may be configured to learn the context associated with certain token labels and corresponding actions required to moderate an input text string in a context aware and meaningful manner. For example, in a sentence "UAS is a great country," the word "USA" is misspelled to become "UAS." As the context indicates that "UAS" is a country, a meaningful moderation action is a swap (swap "A" and "S") and the correct token label for "UAS" is "USA." Yet in a different sentence "UAS stands for unmanned aircraft systems," the context suggests that "UAS" does not need to be moderated. Yet another example is for an input text string "M he Y*h0! Great age 1n." Via learning according to the present teaching, the contextual information indicates that each word needs to be capitalized. Combined with token label and action type learning, the present teaching yields the moderates text string "Make Yahoo Great Again," which is a result of context aware text moderation. Thus, in learning the text moderation models 140, the context of the training text strings can be essential in learning.

The learning results (e.g., adjustments to the model parameters) from the context learning unit 570, the action type learning unit 520, and the token label learning unit 540 may be provided to the contextual action/token learning unit 560 where individual learning results may be considered and integrated to update the existing text moderation models 140 by adjusting parameters of the models to generate updated text moderation models.

Figure 6:
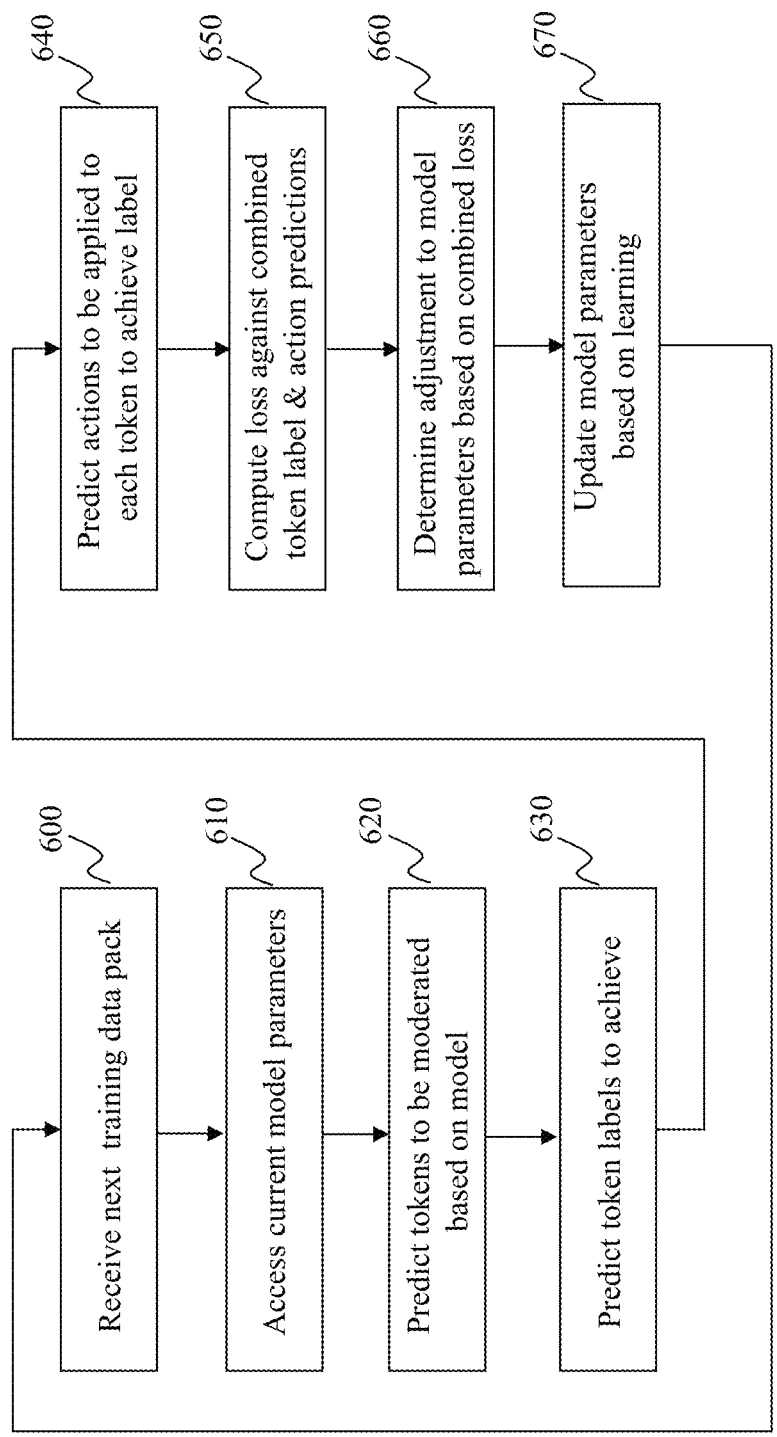
FIG. 6 is a flowchart of an exemplary process of a learning mechanism, in accordance with an exemplary embodiment of the preset teaching.

FIG. 6 is a flowchart of an exemplary process of the learning mechanism 140, in accordance with an exemplary embodiment of the preset teaching. In this illustrated process, the flow is directed to an overall learning with combined token label and action type dimensions and the learning process is repetitive. When the next training data pack is received at 600, the current text moderation models are accessed at 610. Using the current model parameters, the token label learning unit 540 predicts, at 620, tokens in a text string in the training data pack to be moderated and predicts, at 630, the token labels to be derived after the moderation. Similarly, the action type learning unit 520 predicts, at 640, normalization or moderation action(s) to be applied to each of the predicted tokens. Based on the predicted tokens, token labels, and actions, the contextual action/token learning unit 560 compares them with the ground truth tokens, token labels, and action types in the training data pack and computes, at 650, a combined loss of the overall objective function. Based on the computed loss, the contextual action/token learning unit 560 determines, at 660, adjustments to be made to the parameters of the text moderation models 140 and then accordingly updates, at 670, the text moderation models 140 based on the adjusted parameters.

Figure 7:
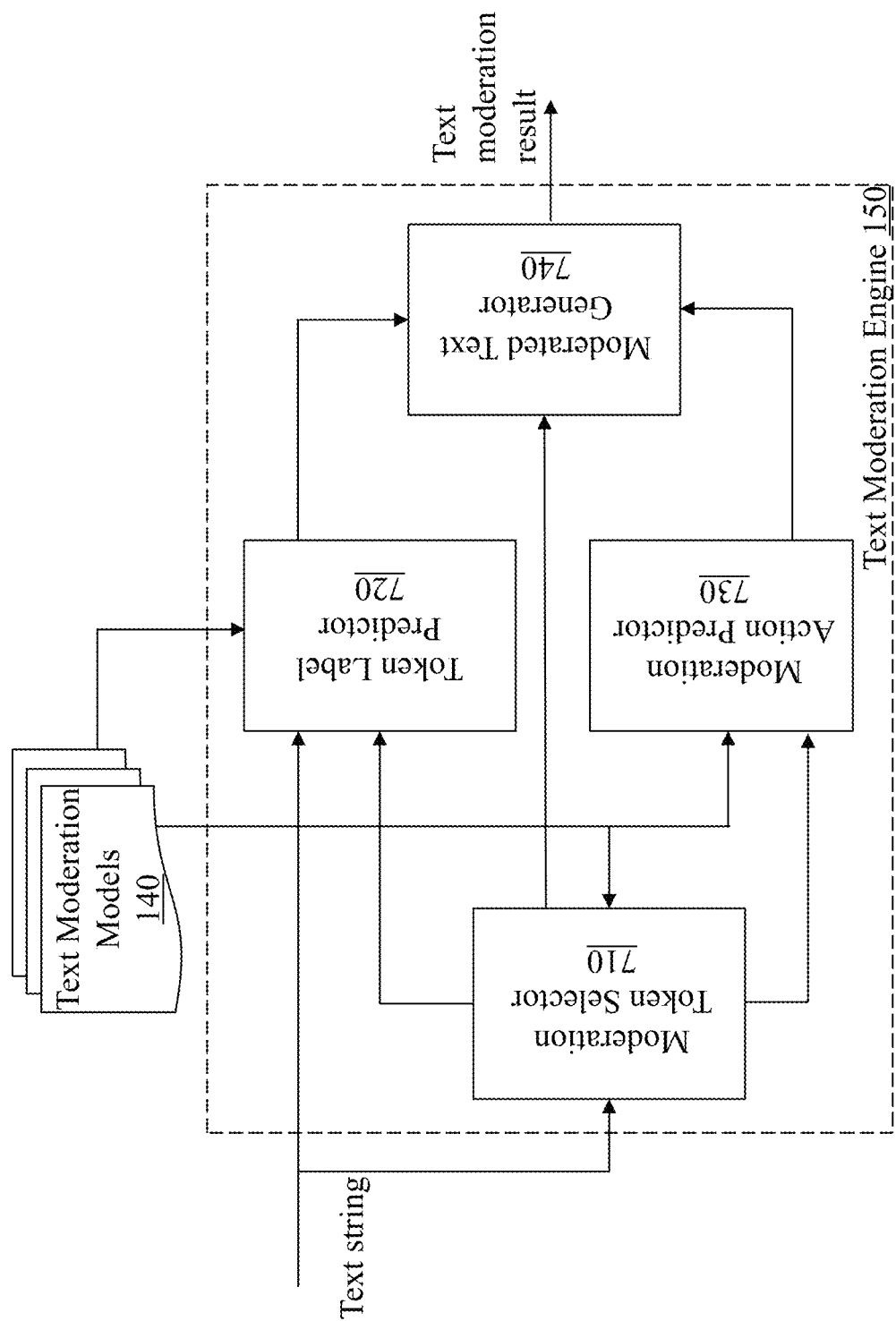
FIG. 7 depicts an exemplary high level system diagram of a text moderation engine, in accordance with an exemplary embodiment of the present teaching.

FIG. 7 depicts an exemplary high level system diagram of the text moderation engine 150, in accordance with an exemplary embodiment of the present teaching. As shown in FIG. 1A, the text moderation engine 150 is to moderate an input text string based on trained text moderation models 140. Specifically, given a text string as an input, the text moderation engine 150 is to predict token(s) that needs to be normalized so that such token(s) has certain token labels and to predict normalization action(s) to be applied to the predicted tokens to yield normalized tokens with the predicted token labels. The result from the text moderation engine 150 is a text moderation result corresponding to a moderated text string.

Figure 8:
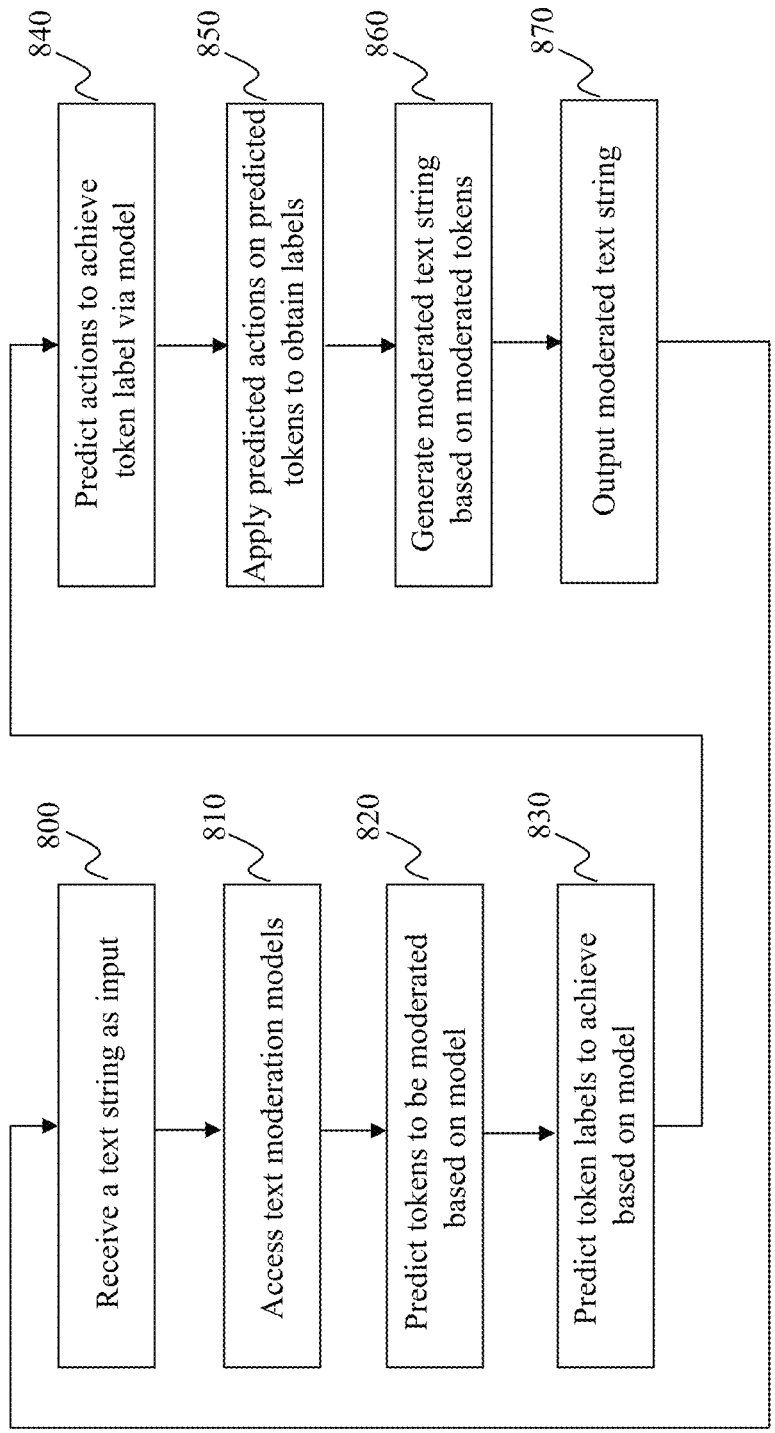
FIG. 8 is a flowchart of an exemplary process of a text moderation engine, in accordance with an exemplary embodiment of the present teaching.

In this illustrated embodiment, the text moderation engine 150 comprises moderation token selector 710, a token label predictor 720, a moderation action predictor 730, and a moderated text generator 740. FIG. 8 is a flowchart of an exemplary process of the text moderation engine 150, in accordance with an exemplary embodiment of the present teaching. When a text string is received at 800, the text moderation models 140 are accessed at 810 and used by the token selector 710 to predict, at 820, tokens that need to be moderated based on the text moderation models 140. For the tokens to be moderated, the token label predictor 720 predicts, at 830, labels for such tokens based on the text moderation models 140. To realizing the moderation of the selected tokens to achieve the predicted token labels, the moderation action predictor 730 predicts, at 840, actions to be applied to the selected tokens to derive moderated tokens with predicted labels. The predicted tokens, token labels, and actions are sent to the moderated text generator 740 which applies, at 850, the predicted actions to the selected tokens and obtain predicted token labels and generates, at 860, moderated text string based on the moderated tokens with predicted labels. Such moderated text string is then output, at 870, from the moderated text generator 740.

Figure 9:
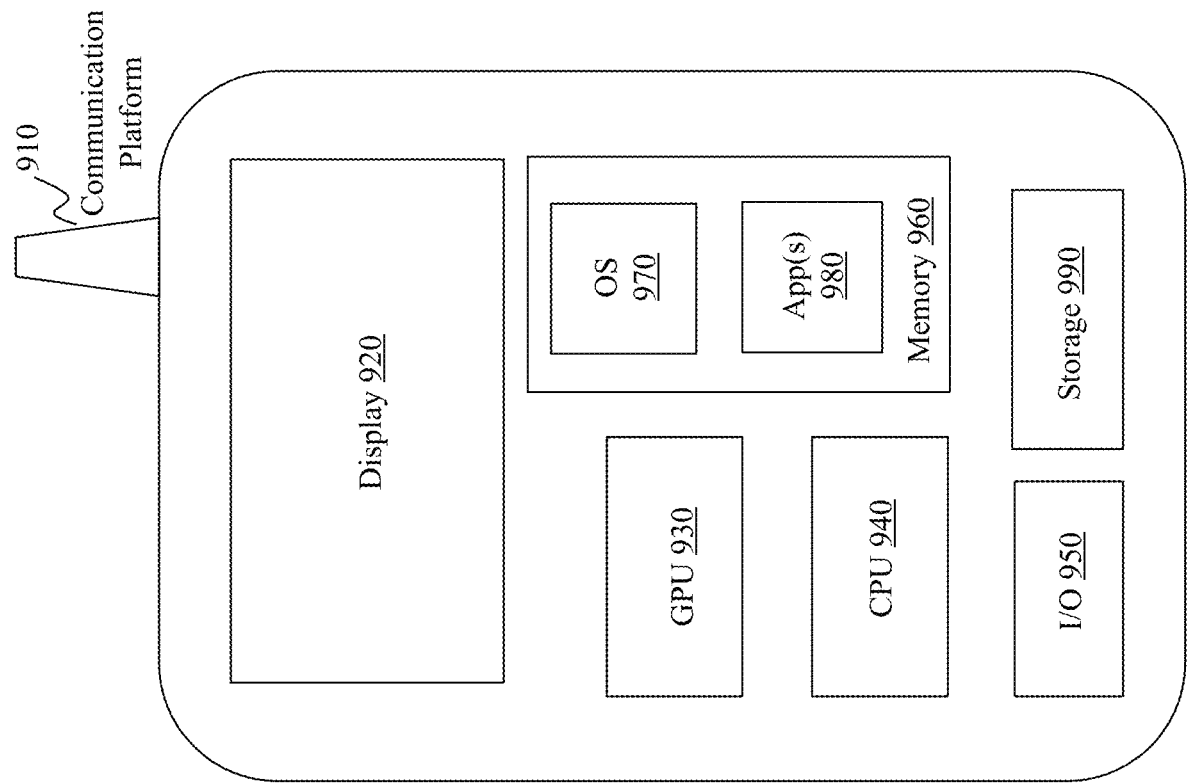
FIG. 9 is an illustrative diagram of an exemplary mobile device architecture that may be used to realize a specialized system implementing the present teaching in accordance with various embodiments.

FIG. 9 is an illustrative diagram of an exemplary mobile device architecture that may be used to realize a specialized system implementing the present teaching in accordance with various embodiments. In this example, the user device on which the present teaching may be implemented corresponds to a mobile device 900, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 900 may include one or more central processing units ("CPUs") 940, one or more graphic processing units ("GPUs") 930, a display 920, a memory 960, a communication platform 910, such as a wireless communication module, storage 990, and one or more input/output (I/O) devices 940. Any other suitable component, including but not limited to a system bus or a controller (not shown), may also be included in the mobile device 900. As shown in FIG. 9, a mobile operating system 970 (e.g., iOS, Android, Windows Phone, etc.), and one or more applications 980 may be loaded into memory 960 from storage 990 in order to be executed by the CPU 940. The applications 980 may include a browser or any other suitable mobile apps for managing a machine learning system according to the present teaching on mobile device 900. User interactions, if any, may be achieved via the I/O devices 940 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 10 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1000 may be used to implement any component or aspect of the framework as disclosed herein. For example, the learning system as disclosed herein may be implemented on a computer such as computer 1000, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1000, for example, includes COM ports 1050 connected to and from a network connected thereto to facilitate data communications. Computer 1000 also includes a central processing unit (CPU) 1020, in the form of one or more processors, for executing program instructions. The exemplary computer platform includes an internal communication bus 1010, program storage and data storage of different forms (e.g., disk 1070, read only memory (ROM) 1030, or random access memory (RAM) 1040), for various data files to be processed and/or communicated by computer 1000, as well as possibly program instructions to be executed by CPU 1020. Computer 800 also includes an I/O component 1060, supporting input/output flows between the computer and other components therein such as user interface elements 1080. Computer 1000 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for text processing, the method comprising:
receiving input data including a plurality of text strings that have been moderated or do not need to be moderated;
generating a plurality of manipulated text strings based on the plurality of text strings by;
for each of the plurality of text strings,
applying a manipulation to each of at least one original token in the text string to generate a manipulated token, wherein the original token has a ground truth token label, and
determining, with respect to each of the at least one manipulated token corresponding to one of the at least one original token, a ground truth action which, when applied to the manipulated token, produces the ground truth token label of the corresponding original token; and
generating training data having a plurality of training data packs, each of which corresponds to one of the plurality of text strings in the input data and includes a corresponding manipulated text string with at least one manipulated token therein, at least one ground truth token label corresponding to the at least one manipulated token, and at least one ground truth action which, when applied to the at least one manipulated token produces the corresponding at least one ground truth token label, wherein the training data are for training text moderation models that facilitate text moderation.

2. The method of claim 1, wherein the manipulation includes one of identity, insertion, deletion, swap, and substitution.

3. The method of claim 1, wherein
each of the at least one original token includes one of a word or a phrase which does not need to be moderated; and
each of the at least one manipulated token needs to be moderated.

4. The method of claim 1, further comprising machine learning the text moderation models based on the training data.

5. The method of claim 4, wherein the step of machine learning based on the training data comprises:
with respect to each of the training data packs in the training data,
predicting, based on parameters of the text moderation models, at least one manipulated token that needs to be moderated and at least one token label thereof upon moderation, predicting, based on the parameters, at least one action to be applied to the at least one manipulated token to generate the at least one token label, computing a loss based on a first discrepancy between the predicted at least one token label and the at least one ground truth token label and a second discrepancy between the predicted at least one action and the at least one ground truth action, and determining an adjustment to at least one parameter characterizing the text moderation models based on the loss.

6. The method of claim 5, further comprising updating the text moderation models based on the adjusted at least one parameter.

7. The method of claim 1, further comprising performing text moderation based on the text moderation models, which comprises:

receiving a text string;

identifying, based on the text moderation models, one or more tokens in the text string that need to be moderated;

predicting corresponding one or more token labels for the one or more tokens and one or more actions to be performed on the one or more tokens to derive the predicted one or more token labels;

applying the one or more actions to the one or more tokens to obtain moderated one or more tokens with the corresponding one or more token labels; and generating a moderated text string based on the moderated one or more tokens and the text string.

8. Machine readable and non-transitory medium having information recorded thereon, where the information, when read by a machine, causes the machine to perform:

receiving input data including a plurality of text strings that have been moderated or do not need to be moderated;

generating a plurality of manipulated text strings based on the plurality of text strings by;

for each of the plurality of text strings, applying a manipulation to each of at least one original token in the text string to generate a manipulated token, wherein the original token has a ground truth token label, and determining, with respect to each of the at least one manipulated token corresponding to one of the at least one original token, a ground truth action which, when applied to the manipulated token, produces the ground truth token label of the corresponding original token; and generating training data having a plurality of training data packs, each of which corresponds to one of the plurality of text strings in the input data and includes a corresponding manipulated text string with at least one manipulated token therein, at least one ground truth token label corresponding to the at least one manipulated token, and at least one ground truth action which, when applied to the at least one manipulated token produces the corresponding at least one ground truth token label, wherein the training data are for training text moderation models that facilitate text moderation.

9. The medium of claim 8, wherein the manipulation includes one of identity, insertion, deletion, swap, and substitution.

10. The medium of claim 8, wherein each of the at least one original token includes one of a word or a phrase which does not need to be moderated; and each of the at least one manipulated token needs to be moderated.

11. The medium of claim 8, wherein the information, when read by the machine, further causes the machine to perform learning the text moderation models based on the training data.

12. The medium of claim 11, wherein the step of machine learning based on the training data comprises:

with respect to each of the training data packs in the training data, predicting, based on parameters of the text moderation models, at least one manipulated token that needs to be moderated and at least one token label thereof upon moderation, predicting, based on the parameters, at least one action to be applied to the at least one manipulated token to generate the at least one token label, computing a loss based on a first discrepancy between the predicted at least one token label and the at least one ground truth token label and a second discrepancy between the predicted at least one action and the at least one ground truth action, and determining an adjustment to at least one parameter characterizing the text moderation models based on the loss.

13. The medium of claim 12, wherein the information, when read by the machine, further causes the machine to perform updating the text moderation models based on the adjusted at least one parameter.

14. The medium of claim 8, wherein the information, when read by the machine, further causes the machine performing text moderation based on the text moderation models, which comprises:

receiving a text string;

identifying, based on the text moderation models, one or more tokens in the text string that need to be moderated;

predicting corresponding one or more token labels for the one or more tokens and one or more actions to be performed on the one or more tokens to derive the predicted one or more token labels;

applying the one or more actions to the one or more tokens to obtain moderated one or more tokens with the corresponding one or more token labels; and generating a moderated text string based on the moderated one or more tokens and the text string.

15. A system for text processing comprising:

a training data generator implemented by a processor coupled to a memory and configured for receiving input data including a plurality of text strings that have been moderated or do not need to be moderated;

a manipulation mechanism implemented by the processor coupled to the memory and configured for generating a plurality of manipulated text strings based on the plurality of text strings by, for each of the plurality of text strings, applying a manipulation to each of at least one original token in the text string to generate a manipulated token, wherein the original token has a ground truth token label;

a normalization action determiner implemented by the processor coupled to the memory and configured for determining, with respect to each of the at least one manipulated token corresponding to one of the at least one original token, a ground truth action which, when applied to the manipulated token, produces the ground truth token label of the corresponding original token; and a training data pack generator implemented by the processor coupled to the memory and configured for generating training data having a plurality of training data packs, each of which corresponds to one of the plurality of text strings in the input data and includes a corresponding manipulated text string with at least one manipulated token therein, at least one ground truth token label corresponding to the at least one manipulated token, and at least one ground truth action which, when applied to the at least one manipulated token produces the corresponding at least one ground truth token label, wherein the training data are for training text moderation models that facilitate text moderation.

16. The system of claim 15, wherein the manipulation includes one of identity, insertion, deletion, swap, and substitution.

17. The system of claim 15, wherein
each of the at least one original token includes one of a word or a phrase which does not need to be moderated; and
each of the at least one manipulated token needs to be moderated.

18. The system of claim 15, further comprising a learning mechanism configured for machine learning the text moderation models based on the training data.

19. The system of claim 18, wherein the machine learning comprises:
with respect to each of the training data packs in the training data,
predicting, based on parameters of the text moderation models, at least one manipulated token that needs to be moderated and at least one token label thereof upon moderation,
predicting, based on the parameters, at least one action to be applied to the at least one manipulated token to generate the at least one token label,
computing a loss based on a first discrepancy between the predicted at least one token label and the at least one ground truth token label and a second discrepancy between the predicted at least one action and the at least one ground truth action, and
determining an adjustment to at least one parameter characterizing the text moderation models based on the loss.

20. The system of claim 15, further comprising a text moderation engine implemented by the processor coupled to the memory and configured for performing text moderation based on the text moderation models, which comprises:
receiving a text string;
identifying, based on the text moderation models, one or more tokens in the text string that need to be moderated;
predicting corresponding one or more token labels for the one or more tokens and one or more actions to be performed on the one or more tokens to derive the predicted one or more token labels;
applying the one or more actions to the one or more tokens to obtain moderated one or more tokens with the corresponding one or more token labels; and
generating a moderated text string based on the moderated one or more tokens and the text string.

* * * * *